H. BOLDE.
TRIFOCAL LENS.
APPLICATION FILED JAN. 25, 1915.

1,158,102. Patented Oct. 26, 1915.

Witnesses:
Geo. C. Cheney.
Waldo M. Chapin

Inventor
Henry Bolde
By his Attorneys
Rosenbaum, Stockbridge & Borst

UNITED STATES PATENT OFFICE.

HENRY BOLDE, OF NEW YORK, N. Y., ASSIGNOR TO GENERAL OPTICAL COMPANY, INC., A CORPORATION OF NEW YORK.

TRIFOCAL LENS.

1,158,102.   Specification of Letters Patent.   Patented Oct. 26, 1915.

Application filed January 25, 1915. Serial No. 4,111.

*To all whom it may concern:*

Be it known that I, HENRY BOLDE, a citizen of the United States, residing at the city of New York, in the borough of Brooklyn and State of New York, have invented certain new and useful Improvements in Trifocal Lenses, of which the following is a full, clear, and exact description.

This invention relates to trifocal lenses of the kind adapted for eyeglasses and spectacles, the object being to provide a process of making the same, whereby the relative areas of the three fields of vision of the lens can be controlled during the manufacture, and the lens, as a whole, is capable of receiving a cylindrical or prismatic formation without disturbing the spherical formation of the minor lenses which afford the two extra fields of vision.

In a prior patent taken out by me, December 30, 1913, Serial No. 1,082,491, I have disclosed a trifocal lens in which two minor lenses are applied to the respective faces of a major lens, the purpose being to enable me to grind the two surfaces of the major lens with the minor lenses seated therein, independently of each other and thereby cut away the exact amount of material from each side to leave a predetermined or required area of the small lens exposed upon the surface of the large lens. An objection to this patented construction arises from the fact that a "cylinder" or "prism" cannot be added to either side of the lens without disturbing the curvature of the minor lens seated therein and the patented invention was therefore useful only in connection with spherical lenses.

In the present invention, I have devised a structure and process whereby both of the minor lenses may be applied to one face of the major lens in such a manner that their relative areas may be controlled and the opposite face of the major lens is left to receive a "cylinder" or "prism," a simple "sphere," or any other required surface.

My improved structure and process will now be described with reference to the accompanying drawing, in which—

Figure 1:
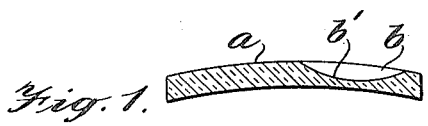
Figure 2:
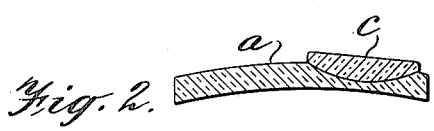
Figure 3:
Figure 4:
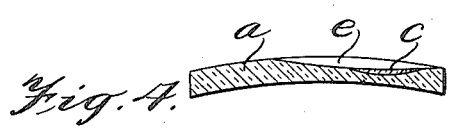
Figure 5:
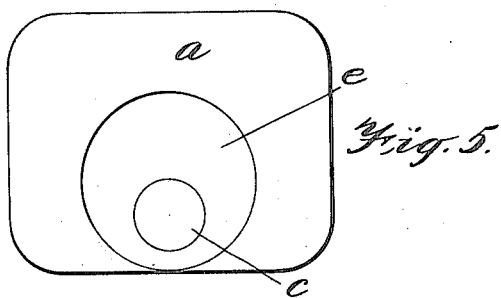
Figure 6:
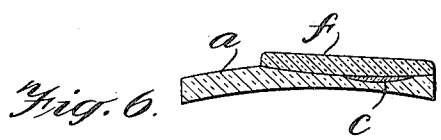
Figure 7:
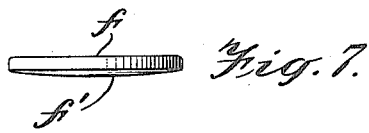
Figure 8:
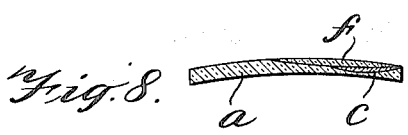
Figure 9:
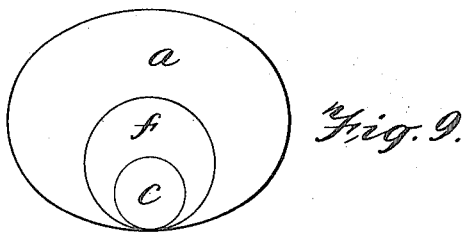

Figure 1 is a section of a rough blank treated in accordance with the first step of the process; Fig. 2 is a section of the same blank having one of the minor lens blanks attached thereto; Fig. 3 is an edge view of one of the minor lens blanks; Fig. 4 is a sectional view of the lens blank showing one of the minor lenses attached thereto and finished and the blank prepared to receive the second minor lens blank; Fig. 5 is a face view of the structure shown in Fig. 4; Fig. 6 is a section of the lens blank with the second minor lens blank attached thereto; Fig. 7 is an edge view of the second minor lens blank; Fig. 8 is a section of the finished trifocal lens; and Fig. 9 is a face view of the finished lens.

In making my improved trifocal lens, I first take a rough lens blank $a$ which may be either of "toric" form, as shown in the drawing, or flat, and I form, by grinding or otherwise, a countersink $b$ therein near one margin of the blank. The surface $b'$ of this countersink is polished or finished and is of the exact curvature required for one face of one of the minor lenses which is to be seated therein. I then take a minor lens blank $c$ which has been prepared upon one face $c'$ with a finished lenticular surface of substantially the same curvature as the surface $b'$ of the countersink and place said minor lens blank into the countersink of the blank $a$. These two parts are then put into a furnace and fused together so as to convert them into one integral fused structure, as seen in Fig. 2. The rough fused structure or blank thus produced is then, by a grinding operation, provided with a second countersink $e$ of considerably larger area than the original countersink $b$ and so located as to remove the outer part of the blank $c$ and a considerable portion of circular form of the major blank $a$ surrounding the minor blank $c$. In grinding this second countersink, it will be seen that the depth of grinding will determine the area of the minor lens $c$ which is left exposed in the bottom of the countersink $e$ so that in the grinding operation, any predetermined or required area of this minor lens can be obtained. The appearance of the face of the blank thus far finished is seen in Fig. 5. Next I take a second minor lens blank $f$ which has been prepared on one face $f'$ with a finished surface of a curvature corresponding substantially with that of the countersink $e$, the blank being larger than the blank $c$ so as to cover or fill the entire countersink $e$. The blank thus assembled is again placed in the furnace and subjected to a second fusing operation to integrally connect the blank $f$ to the compound blank $a$—$c$, the structure as it appears when removed from the furnace being substantially as indicated in Fig. 6. The compound blank consisting of the three parts thus produced is then ready for finishing. The surface containing the minor blanks is ground throughout on a spherical grinding tool to a curvature such as required by the prescription. The material of the blanks is removed in this grinding operation until the diameter or area of the lens $f$ has been reduced to a predetermined size. This size, it will be seen, is obtained without in any manner affecting or depending upon the size already produced of the minor lens $c$, so that by this process the extent of the free fields of vision of the complete trifocal lens can be determined independently of each other. The essential reason for this is, obviously, the fact that the smaller of the two minor lenses is embedded beneath, or covered by, the larger minor lens and is not exposed on the outer surface of the structure where the final grinding operation takes place. The surface containing the minor lenses having been finished, the opposite surface of the major lens blank can be ground and finished with any formation desired; it may be flat, spherical, cylindrical, prismatic, sphero-cylindrical, sphero-prismatic, etc., as required, but whatever formation is given to this reverse side of the lens, the original predetermined values of the minor lenses on the opposite side are not disturbed.

It will be understood, of course, that when the outer surfaces of the finished lens are even throughout, that is to say when the surface of the minor lens does not bulge beyond or sink below the surface of the major lens, it is necessary in order to obtain the three different focal powers, to use glass material of different densities or refractive powers for the respective lenses. This is readily done by selecting the material from the different grades of "crown" and "flint" glass known in the art. It is also to be understood that my invention comprehends in its broader aspect the assembling of the three parts of the lens without resort to the fusing process referred to, that is, the finished lenses may be assembled in the same relative positions described, but secured together by means of Canada balsam or other transparent cement, commonly used for such purposes. The greatest advantages are, however, obtained by using the fusing process.

I claim:

The process of making trifocal lenses which consists in forming a countersink in a major lens blank, then securing a minor lens blank in said countersink, then grinding the exposed surface of the minor blank to a definite curvature and area, and at the same time grinding a portion of the major blank to the same curvature, then superposing a second minor lens blank upon the first minor blank and a part of the major blank and finally grinding away the exposed surface of the second minor blank and the surface of the major blank only, until a definite area and curvature of the second minor blank with respect to the previously fixed area and curvature of the first minor blank, is obtained.

In witness whereof, I subscribe my signature, in the presence of two witnesses.

HENRY BOLDE.

Witnesses:
FREDERICK L. HIGGINS,
AMELIA C. MOESCHEN.